(12) United States Patent
Untch

(10) Patent No.: US 8,720,955 B2
(45) Date of Patent: May 13, 2014

(54) CONNECTING DEVICE FOR CONNECTING A FLEXIBLE CONTAINER TO A FLANGE OR A CONNECTING RING

(75) Inventor: Guenter Untch, Muellheim (DE)

(73) Assignee: Flecotec AG, Muellheim (DE)

( * ) Notice: Subject to any disclaimer, the term of this patent is extended or adjusted under 35 U.S.C. 154(b) by 0 days.

(21) Appl. No.: 13/580,195

(22) PCT Filed: Feb. 11, 2011

(86) PCT No.: PCT/EP2011/000654
§ 371 (c)(1),
(2), (4) Date: Oct. 23, 2012

(87) PCT Pub. No.: WO2011/103965
PCT Pub. Date: Sep. 1, 2011

(65) Prior Publication Data
US 2013/0038054 A1 Feb. 14, 2013

(30) Foreign Application Priority Data
Feb. 24, 2010 (DE) .......................... 10 2010 009 179

(51) Int. Cl.
*F16L 17/00* (2006.01)
(52) U.S. Cl.
USPC ............................ 285/365; 285/260; 285/414
(58) Field of Classification Search
USPC ......... 285/365, 407, 408, 414, 328, 413, 409, 285/410, 260
See application file for complete search history.

(56) References Cited

U.S. PATENT DOCUMENTS

| | | | | |
|---|---|---|---|---|
| 1,525,538 A * | 2/1925 | Evans | ........................... | 285/260 |
| 1,542,940 A * | 6/1925 | Hughes | ........................ | 285/412 |
| 1,948,909 A * | 2/1934 | Evans | .............................. | 138/39 |
| 2,003,732 A * | 6/1935 | Bins | ................................ | 285/238 |
| 2,245,037 A * | 6/1941 | Hersey, Jr. | .................... | 285/260 |
| 2,773,709 A * | 12/1956 | Smith | ........................... | 285/187 |
| 2,911,237 A * | 11/1959 | Olson | ........................... | 285/260 |
| 3,099,015 A * | 7/1963 | Renehan | ....................... | 285/260 |
| 3,409,914 A * | 11/1968 | Jones | ........................... | 623/1.51 |
| 3,441,655 A * | 4/1969 | Turner | ........................... | 174/47 |
| 4,139,223 A * | 2/1979 | Clements | ........................ | 285/99 |
| 4,203,420 A * | 5/1980 | Schoenfelder | ................ | 126/625 |

(Continued)

FOREIGN PATENT DOCUMENTS

| | | |
|---|---|---|
| AU | 84766/75 A | 3/1977 |
| DE | 196 37 486 (A1) | 3/1998 |
| EP | 1 600 681 A1 | 11/2005 |

(Continued)

*Primary Examiner* — Aaron Dunwoody
(74) *Attorney, Agent, or Firm* — Muirhead and Saturnelli, LLC

(57) ABSTRACT

A connecting device for connecting a flexible container to a flange or a connecting ring includes an outer ring, which has an inner surface radially inside and a connection side facing the flange or the connecting ring, and an inner ring, which has an outer surface radially outside and over which an end section of the container can be turned. The outer and inner surfaces are at least partially congruent so that the end section can be clamped between the outer and inner rings. The inner ring can be inserted into the outer ring from the connection side. The outer ring has an accommodating groove radially inside. The accommodating groove extends completely around the outer ring, is open radially inwardly, and has a round cross-section. The inner ring is one-piece and has a round cross-section in an area of the outer surface and is made of a single flexible material.

17 Claims, 4 Drawing Sheets

(56) References Cited

U.S. PATENT DOCUMENTS

| | | | | |
|---|---|---|---|---|
| 4,362,327 | A | * 12/1982 | Mieth | 285/332.3 |
| 4,660,868 | A | * 4/1987 | Totani | 285/354 |
| 4,984,828 | A | * 1/1991 | Lepissier | 285/200 |
| 5,163,712 | A | 11/1992 | Sabo et al. | |
| 5,470,114 | A | * 11/1995 | Umney et al. | 285/367 |
| 6,260,891 | B1 | * 7/2001 | Foering et al. | 285/382.2 |
| 6,425,608 | B1 | * 7/2002 | Nordstrom | 285/374 |
| 6,832,762 | B2 | * 12/2004 | Jost | 277/602 |
| 7,959,190 | B2 | * 6/2011 | McPheat | 285/260 |
| 2006/0175833 | A1 | * 8/2006 | Tenglund | 285/365 |
| 2010/0013217 | A1 | * 1/2010 | Petkovsek et al. | 285/328 |

FOREIGN PATENT DOCUMENTS

| | | | | |
|---|---|---|---|---|
| EP | 1 656 311 | B1 | 5/2006 | |
| EP | 1 702 866 (A1) | | 9/2006 | |
| FR | 2 581 927 | A1 | 11/1986 | |
| FR | 2 776 361 | A1 | 9/1999 | |
| GB | 2027148 | A * | 2/1980 | F16L 21/08 |
| GB | 2061437 | A * | 5/1981 | F16L 21/08 |
| WO | WO 8810391 | A1 * | 12/1988 | F16L 31/00 |
| WO | WO 2009/144359 | A1 | 12/2009 | |

* cited by examiner

CONNECTING DEVICE FOR CONNECTING A FLEXIBLE CONTAINER TO A FLANGE OR A CONNECTING RING

TECHNICAL FIELD

This application relates to a connecting device for connecting a flexible container to a flange or a connecting ring.

BACKGROUND OF THE INVENTION

Known connecting devices, such as disclosed, for example, in EP 1 656 311 B1, are composed of a plurality of elements which must be combined with one another in a complicated manner in order to connect a flexible container to a flange or another container in a way which is as far as possible sealed with respect to the environment. In this context, the flexible container is clamped in between at least two elements. The clamping in is assisted by resources, for example by a circumferential clamping ring which jointly engages around the elements.

The problem on which the system described herein is based comprises configuring the connecting device for connecting a flexible container to a flange or a connecting ring with as few elements as possible, wherein the few elements combine a plurality of functions and are to be as cost-effective as possible to manufacture. In particular, it is sought to provide a connection which is sealed with respect to the environment and which has the smallest possible number of sealing elements which are to be inserted into the device and which are as simple as possible.

SUMMARY OF THE INVENTION

According to the system described herein, a connecting device is provided suitable for connecting a flexible container to a flange or a connecting ring. It has an outer ring, which has an inner surface radially on the inside and a connection side facing the flange or the connecting ring, and an inner ring which has an outer surface radially on the outside. An end section of the container can be turned over about the outer surface. An end section of the container can be turned over about the outer surface. The outer surface and the inner surface are formed at least partially congruent with one another, with the result that the end section can be clamped in between the outer ring and the inner ring in order to bring about a connected position. The inner ring can be inserted into the outer ring from the connection side, and in the connected position said inner ring is supported in the outer ring facing away from the connection side.

According to the system described herein, the outer ring has radially on the inside a completely circumferential, radially inwardly open receptacle groove with a round cross section. The inner ring is formed in one part, and with a round cross section in one area of the outer surface. Furthermore, the inner ring is composed of a single flexible material such that the inner ring can click into the receptacle groove in order to bring about the connected position.

For example, in the proposed configuration as a connecting ring, a further ring which is identical to the outer ring can be connected to the outer ring. In this context, there is no need for any further elements which would, for example, have to be arranged between the outer ring and the connecting ring. The enclosure of the container is completely ensured exclusively with the inner ring and the outer ring, with the result that a direct connection of this type is made possible to the connecting ring. In this context, the functions of securely holding the container and the seal which is sealed with respect to the environment are performed by the two rings which interact with one another.

The flexible material ensures sufficient clamping of the inner ring into the outer ring. The flexibility is required, on the one hand, during the insertion process. The inner ring must become smaller in order to be able to be inserted over an inner diameter of the outer ring on the connection side and into the receptacle groove. Furthermore, the flexibility is preferably utilized for sealing the rings with respect to the container. For this purpose, in preferred embodiments a radially outermost outer diameter of the inner ring is made larger than a radially outermost inner diameter of the outer ring. If there are contours in the groove, one of a plurality of elevated portions in the cross section of the groove or of the inner ring may also have the excess dimension.

The inner ring can be inserted here into the outer ring with the described excess dimension without further resources. A flexible container which is folded over about the inner ring is squeezed in between the rings without further resources by means of a circular-arc-shaped section of the outer surface, with the result that a connection which is sealed with respect to the environment is formed between the rings and the flexible container.

As an alternative or in addition to the solution with the excess dimension, one of the rings can have an at least partially circumferential raised portion with the result that, when viewed in the through-flow direction, the corresponding ring does not end at the same level as the other ring without a raised portion. Being clamped against a common flange, rings which are formed in this way are consequently moved in the through-flow direction with respect to one another, with the result that the desired seal is improved through increased pressure of the ring with the raised portion with respect to the common flange.

The proposed connecting device is easy to install and disinstall in a way which excludes any possibility of incorrect installation. The rings fit together without rotational orientation in just one provided orientation. No positional orientation is necessary here for the inner ring.

In the case of the inner ring there is a cost-effective possibility of having recourse to a standard part. It may be advantageous to provide, when viewed in cross section, a contour in the vicinity of the outer surface, and if appropriate also correspondingly in the receptacle groove.

In advantageous embodiments, attention is paid to avoiding sharp edges on the components which are in contact with the container in order to prevent damage to the container.

In the case of a further advantageous embodiment, the outer ring is composed of a single part.

In a further advantageous embodiment, in a clicked position the inner ring is supported on both sides in the receptacle groove in the axial direction.

In a further advantageous embodiment, the outer ring is formed, on the connection side, with an inner diameter which is smaller than the outer diameter of the inner ring.

In a further advantageous embodiment, the receptacle groove is formed in such a way that, when considered in accordance with a clock face, said receptacle groove engages around the round cross section of the inner ring from approximately 7 o'clock to 1 o'clock in the clicked position or opposingly from 11 o'clock to 5 o'clock.

In a further advantageous embodiment, the outer ring and/or the inner ring have/has a circumferential sealing lip on the respective connection side. Such an elevated portion also performs a centering function with respect to the flange or the connecting ring, irrespective of whether or not a sealing function has to be performed by the elevated portion.

In a further advantageous embodiment, the outer ring and/or the inner ring has, facing the flange in the axial direction, a circumferential groove for receiving a seal.

Sealing the container with respect to the flange or with respect to the connecting ring in a way which is sealed with respect to the environment is therefore advantageously ensured by clamping of the container between the inner ring or the outer ring or both rings and the flange or the connecting ring, wherein the seal or the sealing lip is preferably composed of a hard but elastic plastic, in particular with a hardness of approximately 80 Shore A.

BRIEF DESCRIPTION OF THE DRAWINGS

Embodiments of the system described herein will be explained in more detail below with reference to the figures, of which.

DETAILED DESCRIPTION OF VARIOUS EMBODIMENTS

Figure 1:
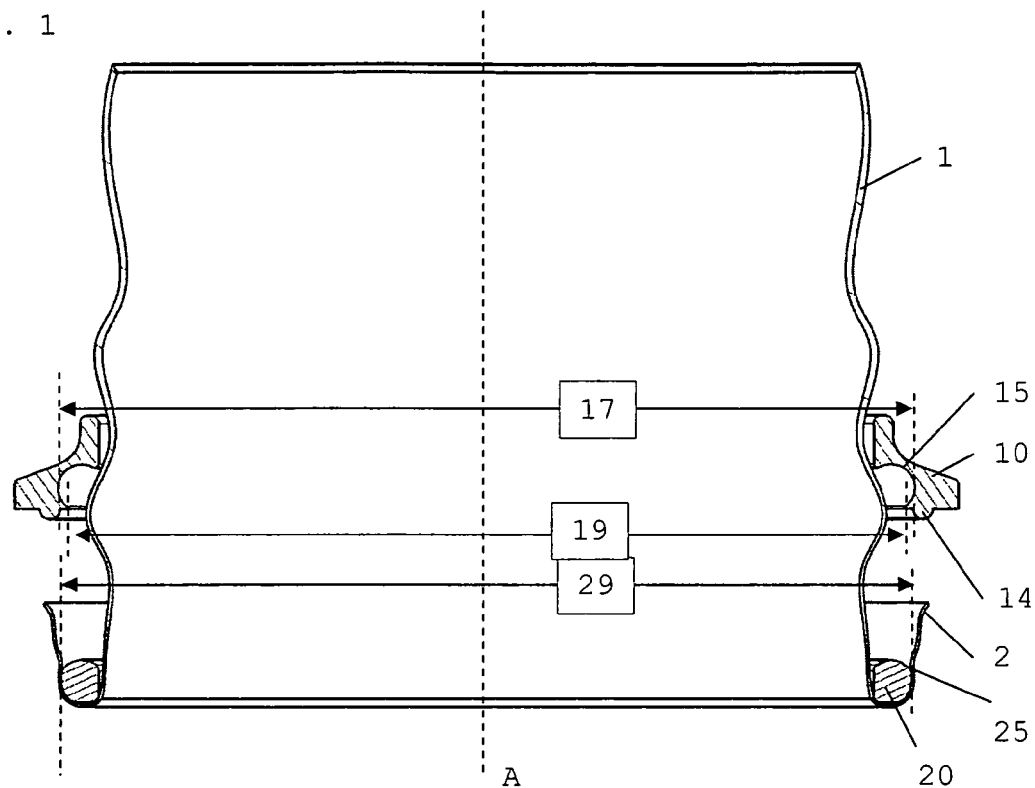
FIG. 1 shows an axial section through a connecting device according to a first exemplary embodiment with a flexible container which is turned over about an inner ring, which is available for clamping into an outer ring in order to bring about a clicked position.

FIGS. 1 to 6 show inventive connecting devices in 3 exemplary embodiments.

In general, the connecting device connects a flexible container 1 to a flange or a connecting ring 3', 3". The connecting device has, as a radially outer element, an outer ring 10, 10', 10" which is always arranged radially outside the container 1. The outer ring 10, 10', 10" has radially on the inside an inner surface facing the container 1. The outer ring 10, 10', 10" has a connection side 18 facing the flange or the connecting ring 3', 3" in the axial direction A.

The connecting device has, as a radially inner element, an inner ring 20, 20', 20", which has radially on the outside an outer surface about which an end section 2 of the container 1 can be turned over. The illustrations in FIGS. 1 to 6 illustrate the container 1 turned over from the inside to the outside about the respective inner ring 20, 20', 20".

The outer surface and the inner surface are formed congruent with one another. According to FIGS. 2 and 4 to 6, the end section 2 is clamped in between the outer ring 10, 10', 10" and the inner ring 20, 20', 20" after the inner ring 20, 20', 20" is clicked into the outer ring 10, 10', 10". Clicking in is understood here to be the insertion of the inner ring into the outer ring, wherein the inner ring secures itself in the outer ring owing to its flexibility. For this purpose, a receptacle groove 15, 15', 15" according to the invention is formed for the inner ring in the outer ring.

The inner ring 20, 20', 20" is inserted from the connection side 18 into the outer ring 10, 10', 10". When it is inserted it is firstly supported facing away from the connection side 18 in the receptacle groove 15, 15', 15". Secondly, the radially inwardly completely circumferential, radially inwardly open receptacle groove 15, 15', 15" with a round cross section supports the inner ring 20, 20', 20" while facing the connection side 18.

The inner ring 20, 20', 20" is formed in one part, with a round cross section in an area of the outer surface. Said inner ring 20, 20', 20" is composed of a single flexible material such that it can click into the receptacle groove 15, 15', 15" in order to bring about the connected position after it has been fitted over a narrower inner diameter 19 of the outer ring 10, 10', 10" on the connection side 18.

Facing the outer ring 10, 10', 10", the inner ring 20, 20', 20" has a round clamping surface 25 which presses the container 1 into the receptacle groove 15, 15', 15" in such a way that it is sealed with respect to the environment. An excess dimension of the inner ring 10, 10', 10" with respect to the receptacle groove 15, 15', 15" is or is not formed depending on the wall thickness of the container 1. The amount of oversize is dimensioned by the difference between a radially outermost outer diameter 29 of the clamping surface 25 and a radially outermost inner diameter 17 of the receptacle groove 15, 15', 15". As a result, a suitable inner ring can be respectively provided for corresponding containers.

Figure 2:
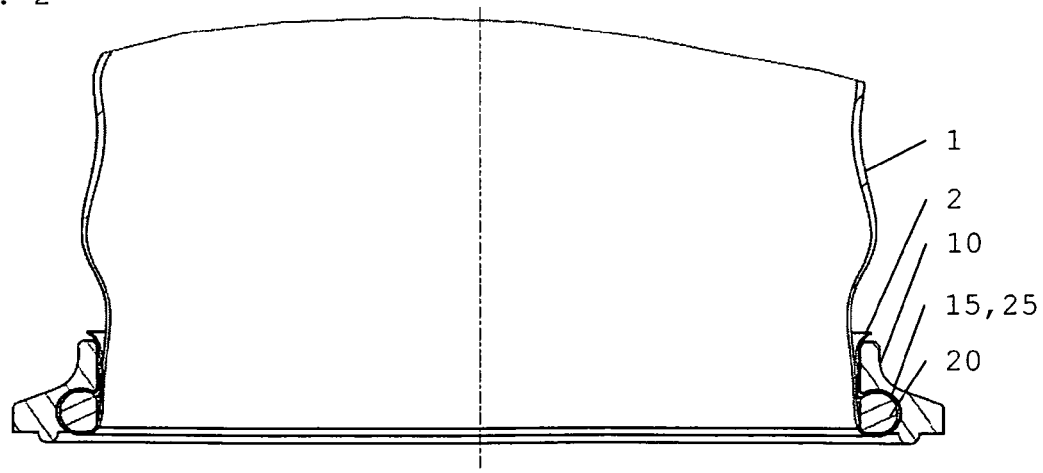
FIG. 2 shows an axial section through the connecting device from FIG. 1 in a clicked position.

The first exemplary embodiment of FIGS. 1 and 2 has a radially inwardly flattened inner ring 20 with an otherwise circular cross section, and an outer ring 10 with a sealing lip 14. The sealing lip 14 is integrally molded circumferentially onto the outer ring 10, facing the flange or the connecting ring.

Figure 3:
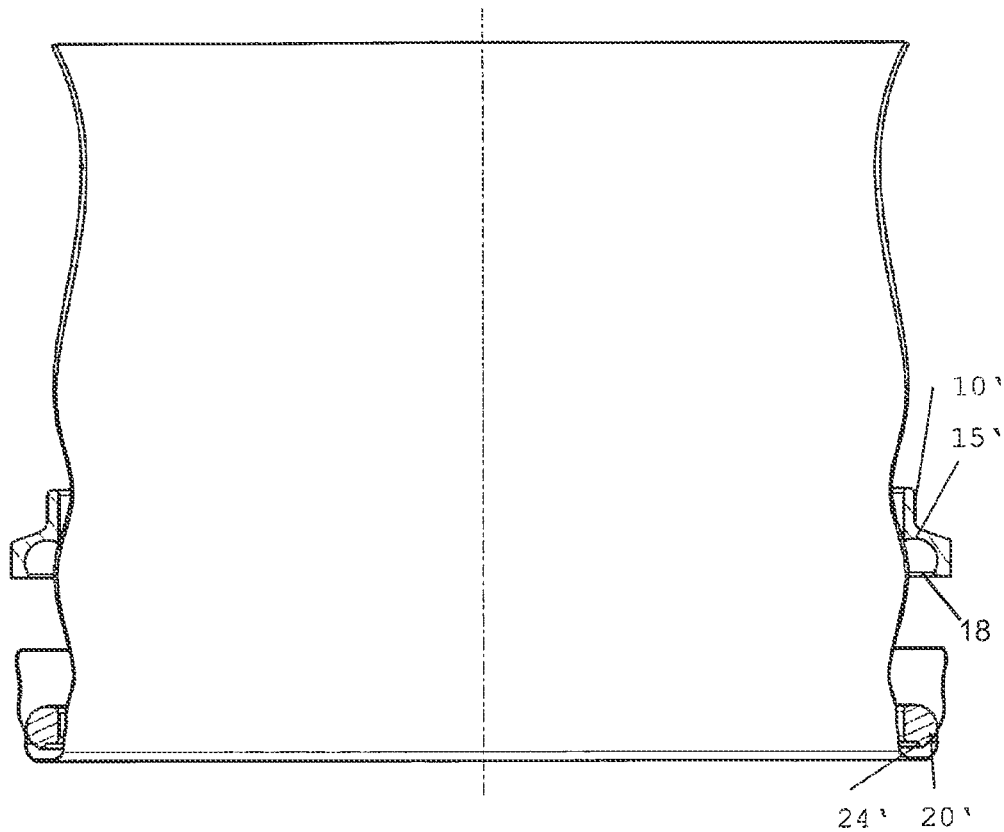
FIG. 3 shows an axial section through a connecting device according to a second exemplary embodiment with a flexible container which is turned over about an inner ring, which is available for clamping into an outer ring in order to bring about the clicked position.
Figure 4:
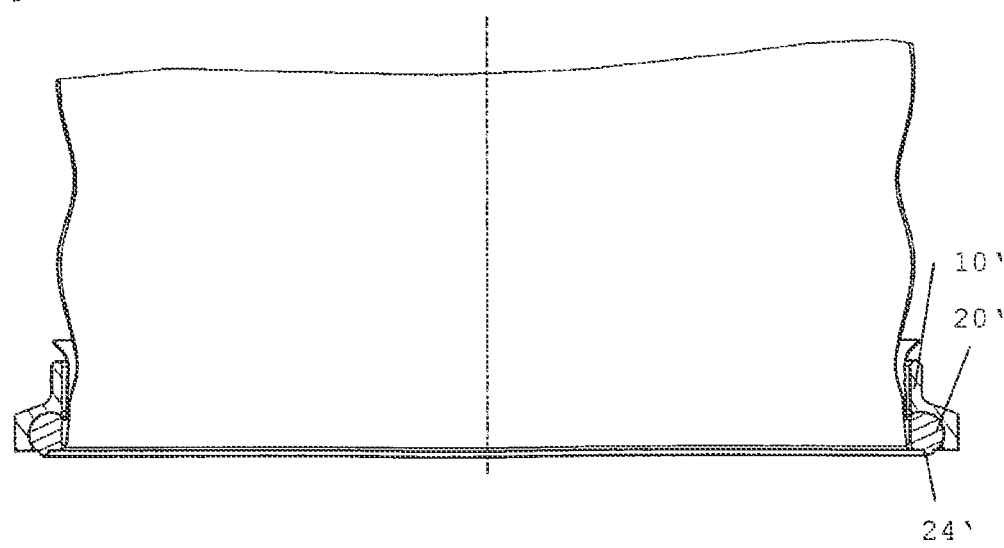
FIG. 4 shows an axial section through the connecting device from FIG. 3 in a clicked position.
Figure 6:
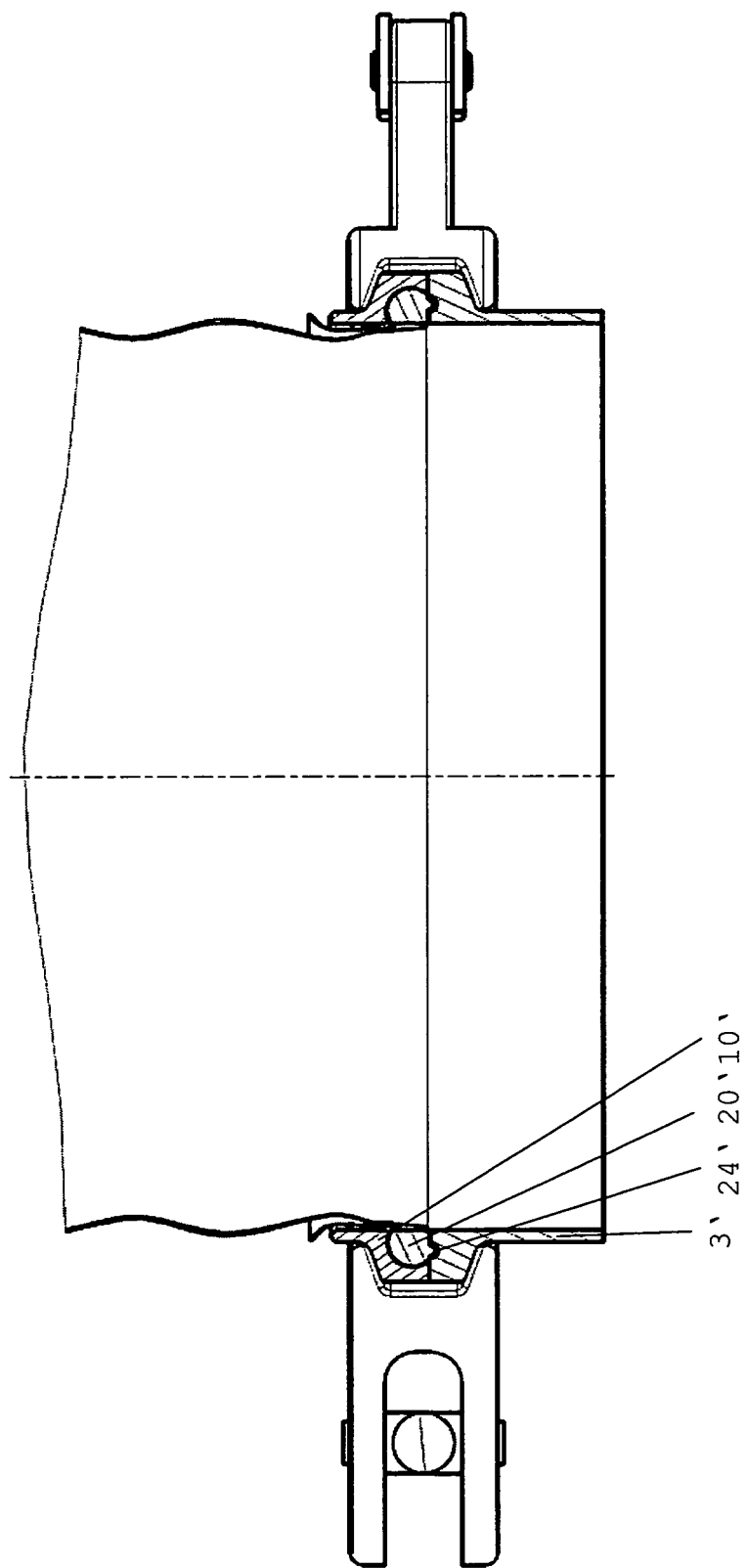
FIG. 6 shows an axial section through the connecting device from FIG. 4, wherein there is a connection to a further connecting ring.

The second exemplary embodiment in FIGS. 3, 4 and 6 has a radially inwardly flattened inner ring 20', which has a projection 24' embodied as a circumferential elevated portion facing the connecting ring 3'. In the connected position, the projection 24' seals the inner ring with the connecting ring 3' against the container 1 which is turned over about the inner ring 20', and said projection 24' seals the connecting ring 3' which is clamped in opposite.

Figure 5:
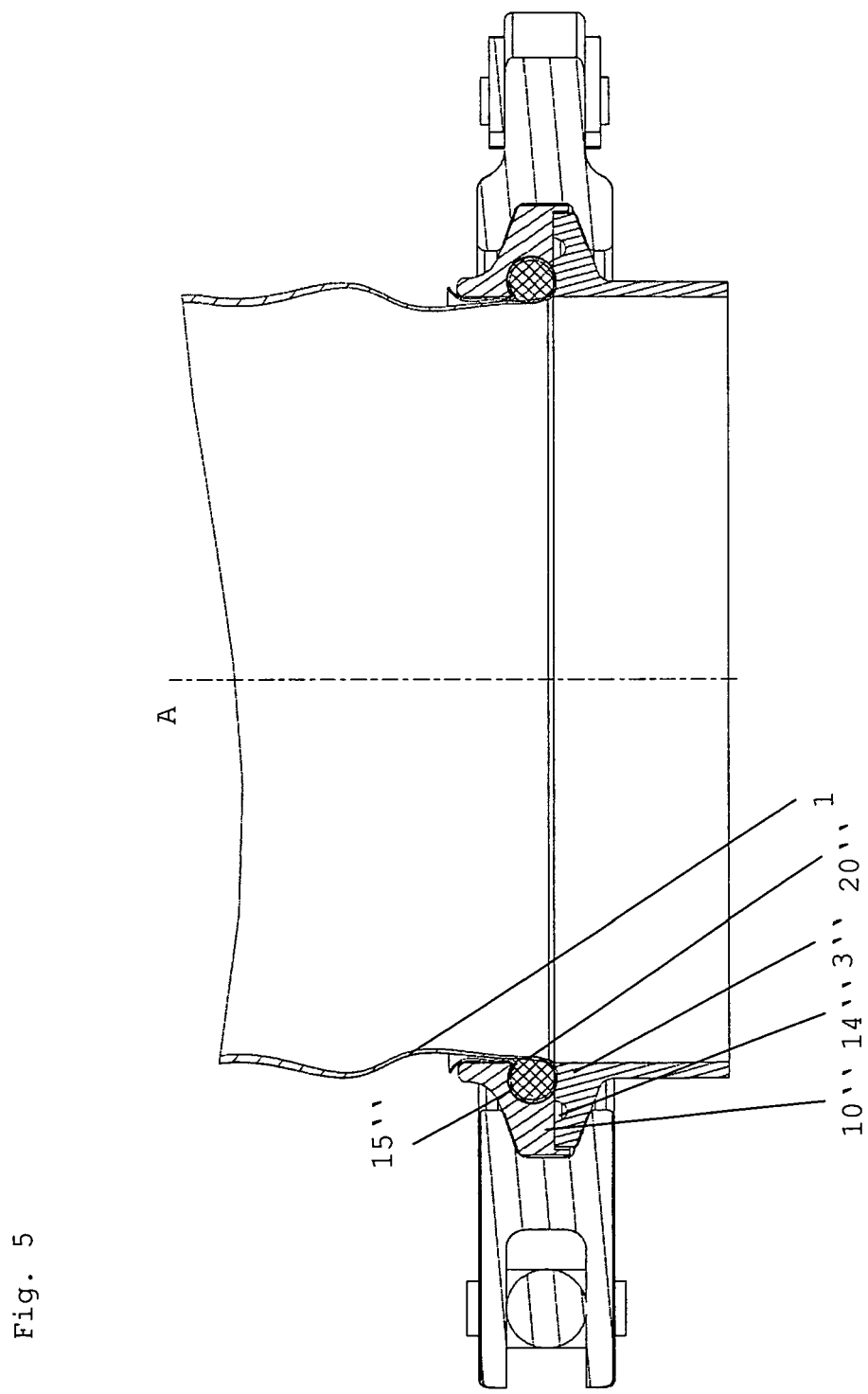
FIG. 5 shows an axial section through a connecting device according to a third exemplary embodiment with a flexible container which is turned over about an inner ring, in the clicked position, there being a connection to a connecting ring.

The third exemplary embodiment in FIG. 5 has an inner ring 20" which is of very simple design and has a completely circular cross section. The outer ring 10" has a circumferential sealing lip 14" facing the connecting ring 3".

The various exemplary embodiments show different outer rings 10, 10', 10" which can be embodied in one part. The sealing lips 14, 14" which are shown can be integrally molded thereon or be inserted as a separate sealing ring into a circumferential groove on the connection side 18 in the outer ring 10, 10", which circumferential groove is open facing the connecting ring 3" in the axial direction.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A connecting device for connecting a flexible container to a flange or a connecting ring, comprising:
   an outer ring which has an inner surface radially on an inside and a connection side facing the flange or the connecting ring; and
   an inner ring which has an outer surface radially on an outside about which an end section of the container can be turned over,
   wherein the outer surface and the inner surface are formed at least partially congruent with one another, with the result that the end section can be clamped in between the outer ring and the inner ring in order to bring about a connected position,
   wherein the inner ring can be inserted into the outer ring from the connection side, and in the connected position the inner ring is supported in the outer ring facing away from the connection side,
   wherein the outer ring has radially on the inside a completely circumferential, radially inwardly open receptacle groove with a round cross section,
   wherein the inner ring is formed in one part and with a round cross section in one area of the outer surface, and
   wherein the inner ring is composed of a single flexible material that allows the inner ring to click into the receptacle groove in order to bring about the connected position.

2. The connecting device as claimed in claim 1, wherein the outer ring is composed of a single part.

3. The connecting device as claimed in claim 1, wherein, in the connected position, the inner ring is supported on both sides in the receptacle groove in an axial direction.

4. The connecting device as claimed in claim 1, wherein the outer ring is formed, on the connection side, with an inner diameter which is smaller than a radially outermost outer diameter of the inner ring.

5. The connecting device as claimed in claim 1, wherein the receptacle groove is formed in such a way that, when considered in accordance with a clock face, said receptacle groove engages around the round cross section of the inner ring from approximately 7 o'clock to 1 o'clock in the connected position.

6. The connecting device as claimed in claim 1, wherein at least one of: the outer ring or the inner ring has a circumferential seal on the respective connection side.

7. The connecting device as claimed in claim 1, wherein at least one of: the outer ring or the inner ring has, facing the flange or the connecting ring in an axial direction, a circumferential groove for receiving a seal.

8. The connecting device as claimed in claim 1, wherein a radially outermost outer diameter of the inner ring is larger than a radially outermost inner diameter of the outer ring.

9. A connecting device for connecting a flexible container to a flange or a connecting ring, comprising:
   an outer ring which has an inner surface radially on an inside and a connection side facing the flange or the connecting ring; and
   an inner ring which has an outer surface radially on an outside about which an end section of the container is disposed, wherein the outer surface and the inner surface are formed at least partially congruent with one another, wherein the end section of the container is clamped between the outer ring and the inner ring in order to bring about a connected position, wherein, in the connected position, the inner ring is supported in the outer ring facing away from the connection side, wherein the outer ring, has radially on the inside, a receptacle groove, and wherein the inner ring clicks into the receptacle groove in order to bring about the connected position.

10. The connecting device as claimed in claim 9, wherein the outer ring and the inner ring are each composed of single parts.

11. The connecting device as claimed in claim 9, wherein, in the connected position, the inner ring is supported on both sides in the receptacle groove in an axial direction.

12. The connecting device as claimed in claim 9, wherein the outer ring is formed, on the connection side, with an inner diameter which is smaller than a radially outermost outer diameter of the inner ring.

13. The connecting device as claimed in claim 9, wherein the receptacle groove is formed in such a way that, when considered in accordance with a clock face, the receptacle groove engages around the inner ring from approximately 7 o'clock to 1 o'clock in the clicked position.

14. The connecting device as claimed in claim 9, wherein at least one of: the outer ring or the inner ring has a circumferential seal on the respective connection side.

15. The connecting device as claimed in claim 9, wherein at least one of: the outer ring or the inner ring has, facing the flange or the connecting ring in an axial direction, a circumferential groove for receiving a seal.

16. The connecting device as claimed in claim 9, wherein a radially outermost outer diameter of the inner ring is larger than a radially outermost inner diameter of the outer ring.

17. The connecting device as claimed in claim 9, wherein the inner ring has a round cross section, and wherein the receptacle groove of the outer ring has a round cross section.

* * * * *